US012563539B2

(12) United States Patent
Hao

(10) Patent No.: US 12,563,539 B2
(45) Date of Patent: Feb. 24, 2026

(54) METHOD, DEVICE, AND SYSTEM FOR SIGNAL AND DATA TRANSMISSION IN WIRELESS NETWORKS

(71) Applicant: ZTE Corporation, Shenzhen (CN)

(72) Inventor: Peng Hao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 325 days.

(21) Appl. No.: 18/392,279

(22) Filed: Dec. 21, 2023

(65) Prior Publication Data

US 2024/0129908 A1     Apr. 18, 2024

Related U.S. Application Data

(63) Continuation of application No. PCT/CN22/98460, filed on Jun. 13, 2022.

(51) Int. Cl.
*H04W 72/0453*     (2023.01)
*H04L 5/14*     (2006.01)
*H04W 72/0446*     (2023.01)

(52) U.S. Cl.
CPC ........... *H04W 72/0453* (2013.01); *H04L 5/14* (2013.01); *H04W 72/0446* (2013.01)

(58) Field of Classification Search
CPC ....... H04L 5/14; H04L 5/0064; H04L 5/1461; H04L 5/1469; H04W 72/0446; H04W 72/0453
See application file for complete search history.

(56) References Cited

U.S. PATENT DOCUMENTS

| | | | |
|---|---|---|---|
| 10,778,368 B2 | 9/2020 | Jo et al. | |
| 10,892,883 B2* | 1/2021 | Luo | H04W 72/12 |
| 2019/0059084 A1* | 2/2019 | Lee | H04L 5/0007 |
| 2019/0305923 A1* | 10/2019 | Luo | H04W 72/20 |

(Continued)

FOREIGN PATENT DOCUMENTS

| | | |
|---|---|---|
| CN | 110583077 A | 12/2019 |
| CN | 110602784 A | 12/2019 |

(Continued)

OTHER PUBLICATIONS

International Search Report in International Application No. PCT/CN2022/098460 dated Dec. 22, 2022, 4 pages.

(Continued)

*Primary Examiner* — Faruk Hamza
(74) *Attorney, Agent, or Firm* — Crowell & Moring LLP

(57)     ABSTRACT

This disclosure relates generally to a method, device, and system for signal and data transmission in a wireless network. One method performed by a device performed by a wireless device is disclosed. The method may include: determining an initial format for each time block of a transmission resource pool comprising at least one sub-pool including a first sub-pool, and determining, that a transmission resource segment in the first sub-pool is re-configured from an initial format to an enhanced flexible format, wherein the initial format of the transmission resource segment is same as the initial format of the first sub-pool, and an initial transmission direction of the transmission resource segment is same as an initial transmission direction of the first sub-pool.

18 Claims, 11 Drawing Sheets

(56) References Cited

U.S. PATENT DOCUMENTS

| | | | | |
|---|---|---|---|---|
| 2020/0145996 | A1* | 5/2020 | Sun | H04W 72/21 |
| 2020/0267756 | A1* | 8/2020 | Fakoorian | H04W 76/27 |
| 2021/0219187 | A1* | 7/2021 | Lee | H04W 4/40 |
| 2021/0297226 | A1* | 9/2021 | Abotabl | H04L 5/0094 |
| 2023/0354283 | A1* | 11/2023 | Chen | H04L 5/001 |
| 2024/0179698 | A1* | 5/2024 | Zhang | H04W 72/044 |
| 2025/0132889 | A1* | 4/2025 | Zhang | H04L 5/001 |
| 2025/0266975 | A1* | 8/2025 | Abdelghaffar | H04L 5/0048 |
| 2025/0378537 | A1* | 12/2025 | Crabtree | G06T 5/60 |
| 2025/0380275 | A1* | 12/2025 | Liu | H04L 1/1864 |

FOREIGN PATENT DOCUMENTS

| | | | | | |
|---|---|---|---|---|---|
| CN | 111919486 | A | | 11/2020 | |
| CN | 112715023 | A | | 4/2021 | |
| CN | 114041311 | A | | 2/2022 | |
| CN | 120930811 | A | * | 11/2025 | |
| CN | 120956320 | A | * | 11/2025 | |
| JP | 2021-29010 | A | | 2/2021 | |
| JP | 2023-164349 | A | | 11/2023 | |
| WO | WO-2014108090 | A1 | * | 7/2014 | H04W 72/20 |
| WO | WO-2020034305 | A1 | * | 2/2020 | H04W 56/0015 |
| WO | WO 2021/029402 | A1 | | 2/2021 | |
| WO | WO-2021198722 | A1 | * | 10/2021 | H04W 72/21 |
| WO | WO 2022/096129 | A1 | | 5/2022 | |
| WO | WO-2023173346 | A1 | * | 9/2023 | H04W 72/535 |
| WO | WO-2024010632 | A1 | * | 1/2024 | H04W 72/0446 |
| WO | WO-2024034503 | A1 | * | 2/2024 | H04B 7/15542 |

OTHER PUBLICATIONS

ITRI, "Discussion on potential enhancements on dynamic/flexible TDD," *3GPP TSG RAN WG1#109-e R1-2204442*, May 20, 2022, 8 pages.

Extended European Search Report issueed in European Patent Application No. 22944039.1 dated Jan. 27, 2025, 16 pages.

Japanese-language Office Action issued in Japanese Application No. 2023-575824 dated Aug. 4, 2025, with English translation (7 pages).

NTT Docomo, Inc.; "Discussion on subband non-overlapping full duplex", 3GPP TSG RAN WG1 #109-e, R1-2204380, e-Meeting, May 9-20, 2022 (6 pages).

ZTE; "Discussion of subband non-overlapping full duplex", 3GPP TSG RAN WG1 #109-e, R1-2203204, May 9-20, 2022 (10 pages).

Chinese-language Office Action issued in Chinese Application No. 202280046037.0 dated Oct. 11, 2025, with English translation (14 pages).

* cited by examiner

METHOD, DEVICE, AND SYSTEM FOR SIGNAL AND DATA TRANSMISSION IN WIRELESS NETWORKS

CROSS-REFERENCE TO RELATED APPLICATION

This application is a continuation application of PCT International Patent Application No. PCT/CN2022/098460, filed with the China National Intellectual Property Administration, PRC on Jun. 13, 2022, which is herein incorporated by reference in its entirety.

TECHNICAL FIELD

This disclosure is directed generally to wireless communications, and particularly to a method, device, and system for signal and data transmission in a wireless network.

BACKGROUND

Flexible and efficient wireless transmission resource scheduling is critical in the wireless communication network. The ecosystem in a wireless communication network includes more and more applications that require low latency. These applications include Vehicle-to-Vehicle Communication, self-driving, mobile gaming, etc. Specifically, when Time Division Multiplex (TDD) is deployed in the wireless network, in order to reduce transmission latency, it is desirable to enable full duplex data/signal transmission for certain slot and/or symbol. Versatile schemes for efficient and dynamic transmission resource selection, configuration/re-configuration, and scheduling are critical for achieving this task.

SUMMARY

This disclosure is directed to a method, device, and system for signal and data transmission, as well as transmission resource configuration and scheduling in a wireless network.

In some embodiments, a method performed by a wireless device is disclosed. The method may include: determining an initial format for each time block of a transmission resource pool comprising at least one sub-pool including a first sub-pool, wherein the initial format indicate an initial transmission direction configuration for the each time block, wherein: the initial format of the each time block of the transmission resource pool comprises one of: a downlink (DL) format, an uplink (UL) format, and a flexible format; an initial format of each time block in each of the at least one sub-pool is same; an initial format of the first sub-pool is the DL format or the UL format; and an initial transmission direction of the first sub-pool is consistent with the initial format of the first sub-pool; and determining, that a transmission resource segment in the first sub-pool is re-configured from an initial format to an enhanced flexible format, wherein the initial format of the transmission resource segment is same as the initial format of the first sub-pool, and an initial transmission direction of the transmission resource segment is same as an initial transmission direction of the first sub-pool.

In some embodiments, a method performed by a network element is disclosed. The method may include: determining an initial format for each time block of a transmission resource pool comprising at least one sub-pool including a first sub-pool, wherein the initial format indicate an initial transmission direction configuration for the each time block, wherein: the initial format of the each time block of the transmission resource pool comprises one of: a downlink (DL) format, an uplink (UL) format, and a flexible format; an initial format of each time block in each of the at least one sub-pool is same; an initial format of the first sub-pool is the DL format or the UL format; and an initial transmission direction of the first sub-pool is consistent with the initial format of the first sub-pool; and determining, that a transmission resource segment in the first sub-pool is re-configured from an initial format to an enhanced flexible format, wherein the initial format of the transmission resource segment is same as the initial format of the first sub-pool, and an initial transmission direction of the transmission resource segment is same as an initial transmission direction of the first sub-pool.

In some embodiments, there is a network element or a UE comprising a processor and a memory, wherein the processor is configured to read code from the memory and implement any methods recited in any of the embodiments.

In some embodiments, a computer program product comprising a computer-readable program medium code stored thereupon, the code, when executed by a processor, causing the processor to implement any method recited in any of the embodiments.

The above embodiments and other aspects and alternatives of their implementations are described in greater detail in the drawings, the descriptions, and the claims below.

DETAILED DESCRIPTION

Wireless Communication Network

Figure 1:
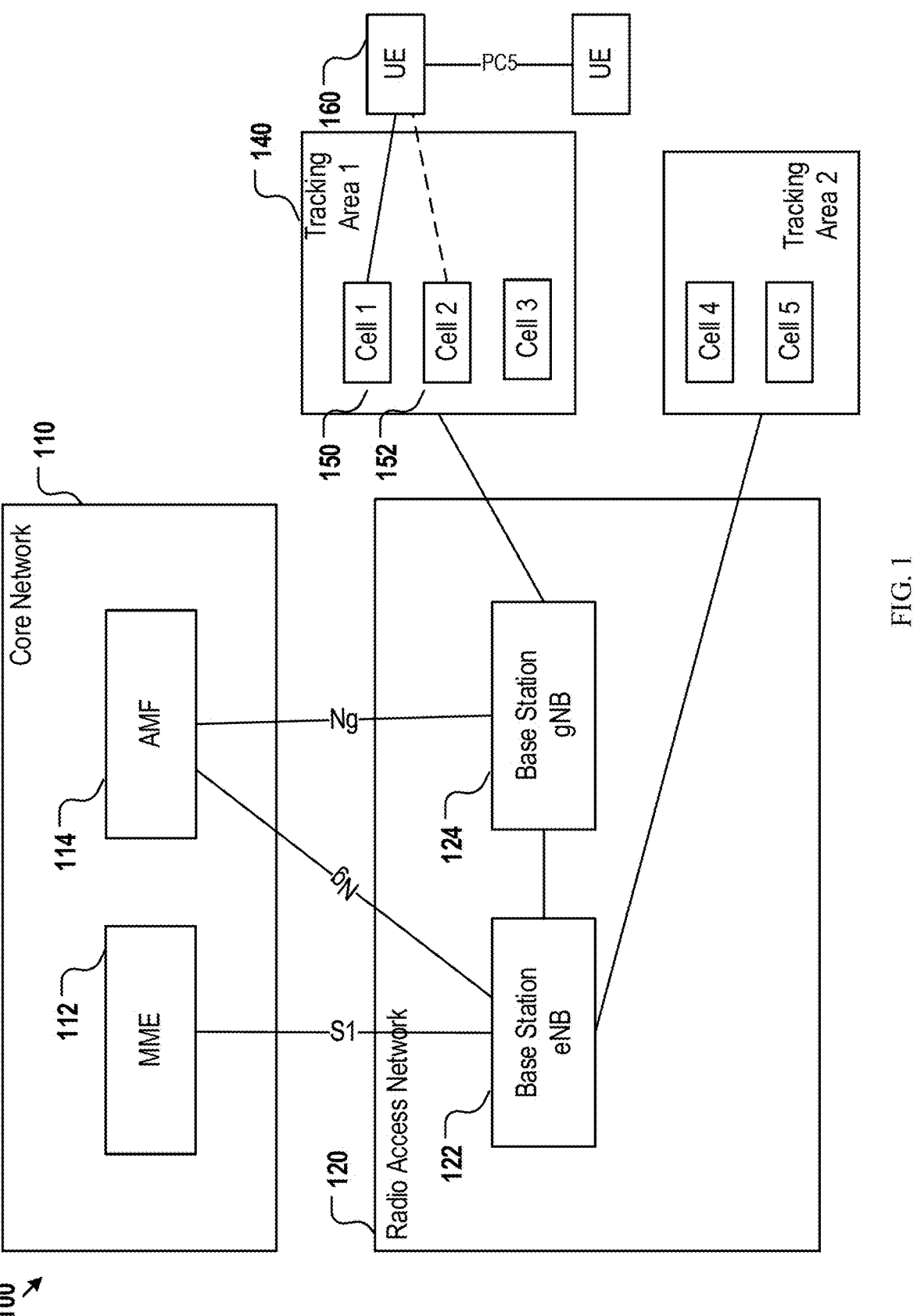
FIG. 1 shows an example wireless communication network.

FIG. 1 shows an exemplary wireless communication network 100 that includes a core network 110 and a radio access network (RAN) 120. The core network 110 further includes at least one Mobility Management Entity (MME) 112 and/or at least one Access and Mobility Management Function (AMF). Other functions that may be included in the core network 110 are not shown in FIG. 1. The RAN 120 further includes multiple base stations, for example, base stations 122 and 124. The base stations may include at least one evolved NodeB (eNB) for 4G LTE, an enhanced LTE eNB (ng-eNB), or a Next generation NodeB (gNB) for 5G New Radio (NR), or any other type of signal transmitting/receiving device such as a UMTS NodeB. The eNB 122 communicates with the MME 112 via an S1 interface. Both the eNB 122 and gNB 124 may connect to the AMF 114 via an Ng interface. Each base station manages and supports at least one cell. For example, the base station gNB 124 may be configured to manage and support cell 1, cell 2, and cell 3.

The gNB 124 may include a central unit (CU) and at least one distributed unit (DU). The CU and the DU may be co-located in a same location, or they may be split in different locations. The CU and the DU may be connected via an F1 interface. Alternatively, for an eNB which is capable of connecting to the 5G network, it may also be similarly divided into a CU and at least one DU, referred to as ng-eNB-CU and ng-eNB-DU, respectively. The ng-eNB-CU and the ng-eNB-DU may be connected via a W1 interface.

The wireless communication network 100 may include one or more tracking areas. A tracking area may include a set of cells managed by at least one base station. For example, tracking area 1 labeled as 140 includes cell 1, cell 2, and cell 3, and may further include more cells that may be managed by other base stations and not shown in FIG. 1. The wireless communication network 100 may also include at least one UE 160. The UE may select a cell among multiple cells supported by a base station to communication with the base station through Over the Air (OTA) radio communication interfaces and resources, and when the UE 160 travels in the wireless communication network 100, it may reselect a cell for communications. For example, the UE 160 may initially select cell 1 to communicate with base station 124, and it may then reselect cell 2 at certain later time point. The cell selection or reselection by the UE 160 may be based on wireless signal strength/quality in the various cells and other factors.

The wireless communication network 100 may be implemented as, for example, a 2G, 3G, 4G/LTE, or 5G cellular communication network. Correspondingly, the base stations 122 and 124 may be implemented as a 2G base station, a 3G NodeB, an LTE eNB, or a 5G NR gNB. The UE 160 may be implemented as mobile or fixed communication devices which are capable of accessing the wireless communication network 100. The UE 160 may include but is not limited to mobile phones, laptop computers, tablets, personal digital assistants, wearable devices, Internet of Things (IoT) devices, MTC/eMTC devices, distributed remote sensor devices, roadside assistant equipment, XR devices, and desktop computers. The UE 160 may also be generally referred to as a wireless communication device, or a wireless terminal. The UE 160 may support sidelink communication to another UE via a PC5 interface.

While the description below focuses on cellular wireless communication systems as shown in FIG. 1, the underlying principles are applicable to other types of wireless communication systems for paging wireless devices. These other wireless systems may include but are not limited to Wi-Fi, Bluetooth, ZigBee, and WiMax networks.

Figure 2:
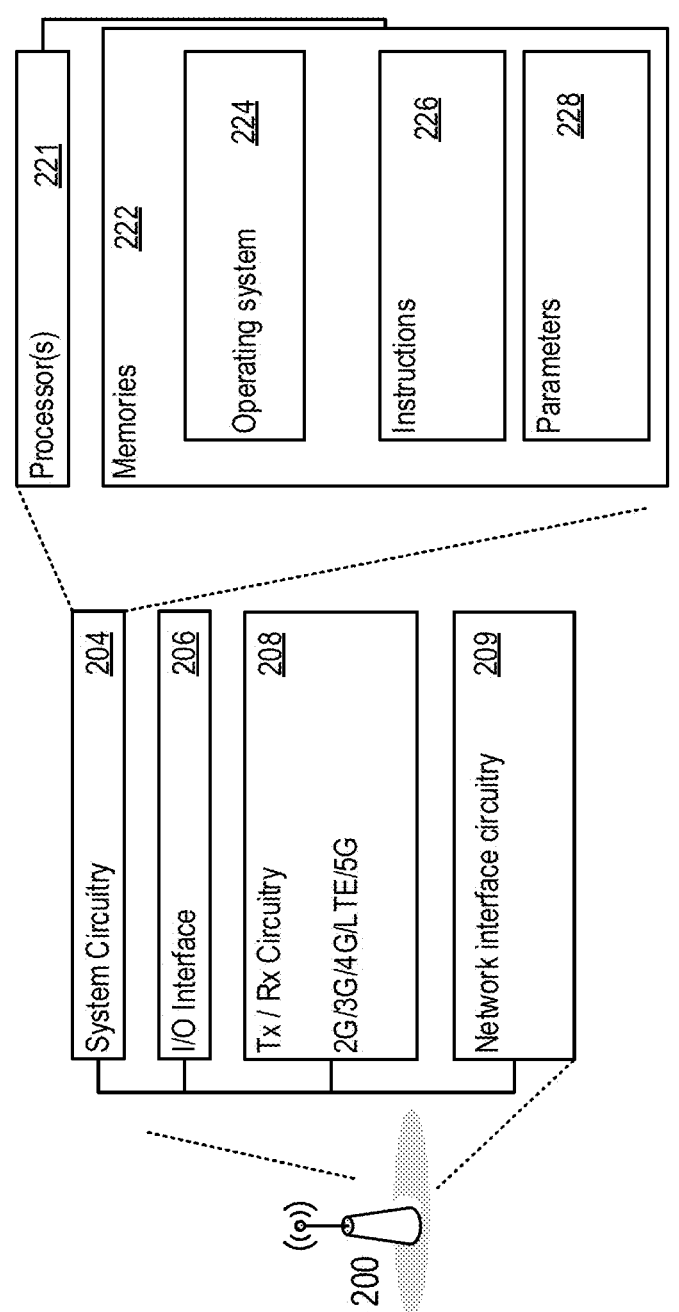
FIG. 2 shows an example wireless network node.

FIG. 2 shows an example of electronic device 200 to implement a network base station (e.g., a radio access network node), a core network (CN), and/or an operation and maintenance (OAM). Optionally in one implementation, the example electronic device 200 may include radio transmitting/receiving (Tx/Rx) circuitry 208 to transmit/receive communication with UEs and/or other base stations. Optionally in one implementation, the electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 221 to perform the functions of the network node. The parameters 228 may include parameters to support execution of the instructions 226. For example, parameters may include network protocol settings, bandwidth parameters, radio frequency mapping assignments, and/or other parameters.

Figure 3:
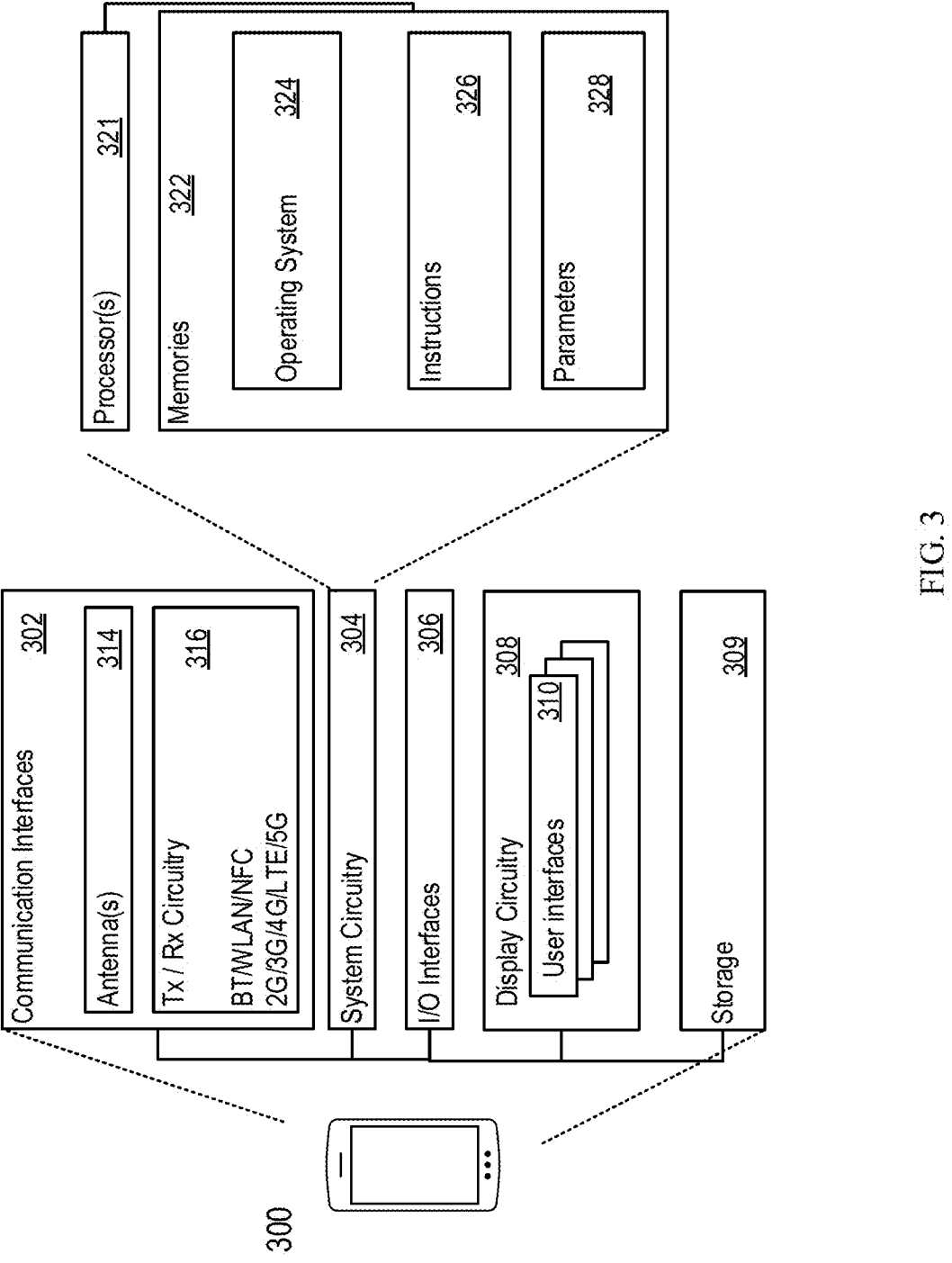
FIG. 3 shows an example user equipment.

FIG. 3 shows an example of an electronic device to implement a terminal device 300 (for example, a user equipment (UE)). The UE 300 may be a mobile device, for example, a smart phone or a mobile communication module disposed in a vehicle. The UE 300 may include a portion or all of the following: communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAG, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

Transmission Resource in Wireless Network

In a wireless network, data and/or signal are transmitted using wireless transmission resource. The transmission resource may be presented as a two-dimensional grid with time being one dimension and frequency being the other dimension.

Figure 4:
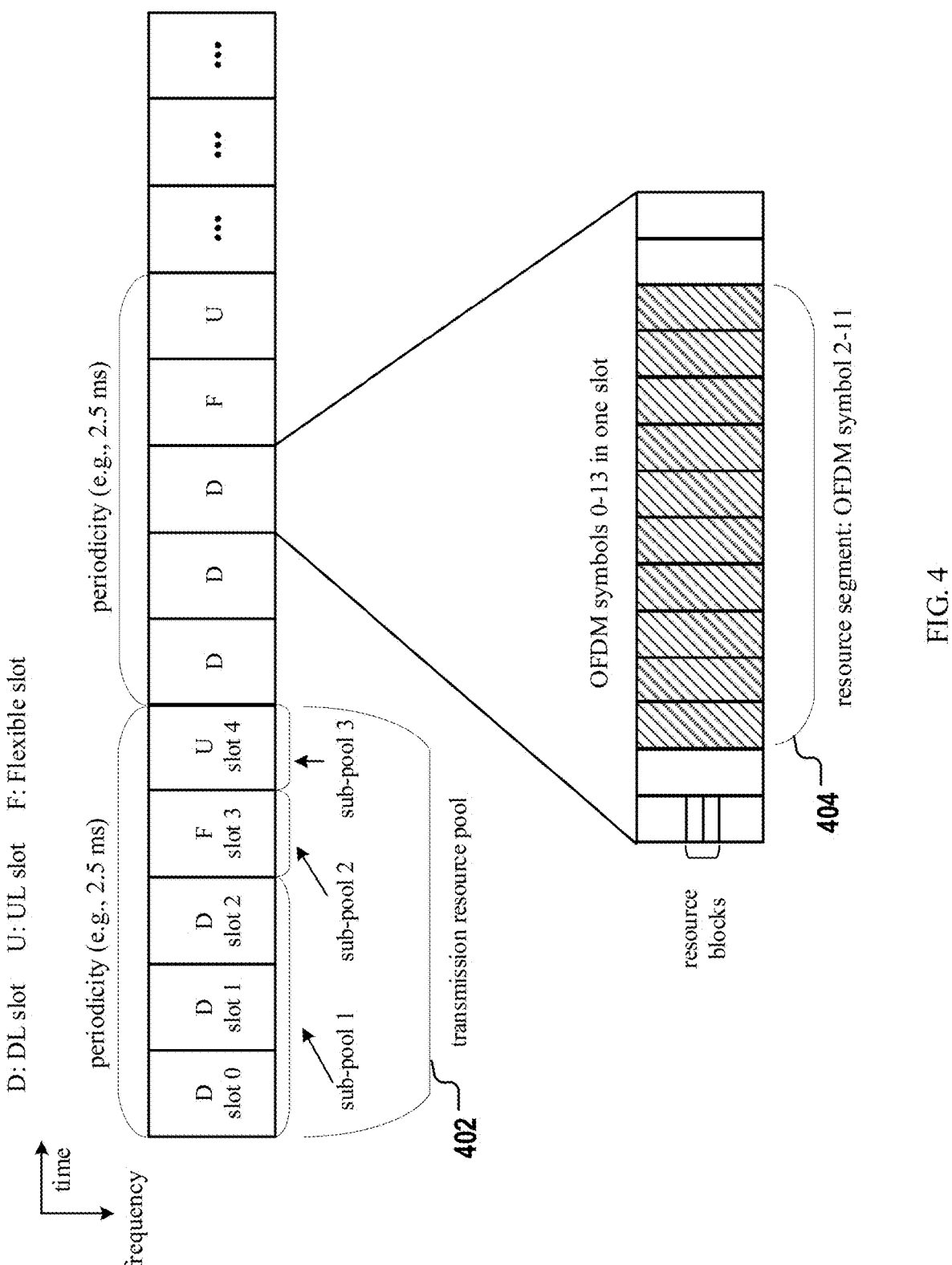
FIG. 4 shows an exemplary transmission resource pool and a pattern/format thereof.

Referring to FIG. 4 for an exemplary transmission resource configuration in a wireless network, such network may be operated in Time Division Duplex (TDD) mode. In the time domain, the transmission resource may be organized by time block, such as slot (or time slot), like slot 0 to slot 4 as shown in FIG. 4. Based on data/signal transmission direction, a slot may be assigned to a downlink (DL) direction, in which case the slot is dedicated to DL transmission/traffic. A slot may also be assigned to an uplink (UL) direction, in which case the slot the slot is dedicated for UL transmission/traffic. A slot may also be configured as a flexible slot, in the sense that the slot may be configured flexibly to support both DL and UL traffic. Further, the flexible slot may support both DL and UL transmission simultaneously, or, the flexible slot may support DL transmission in one cycle, and support UL transmission another cycle. The direction assigned to a slot may be associated with a format of the slot. For example, a DL format (or D format) slot is dedicated to DL transmission; a UL format (or U format) slot is dedicated to UL transmission; a flexible format (or F format) slot may support bi-directional transmission.

The transmission resource may present periodically. Exemplarily, as shown in FIG. 4, the transmission resource has a "DDDFU" pattern (D: DL slot; F: flexible slot; U: UL slot). The character "D", "U", and "F" may each represent a format of a slot. In this example, this particular pattern has a periodicity of 2.5 millisecond (ms). In this disclosure, the transmission resource in each cycle may be referred to as a transmission resource pool. For example, slot 0 to slot 5 form a transmission resource pool 402. In one implementation, continuous slots assigned to a same format may form a transmission resource sub-pool (also called a sub-pool for simplicity). As shown in FIG. 4, slot 0 to slot 2 are all assigned to DL direction, these 3 slots form a sub-pool 1. Similarly, slot 3 itself forms a sub-pool 2, which includes flexible transmission resource; slot 4 itself forms a sub-pool 3, which includes UL transmission resource. Not shown in FIG. 4, a sub-pool may also be formed by continuous OFDM symbols assigned to a same format.

It should be noted that the aforementioned "DDDFU" pattern and its periodicity are merely for example purpose. Other patterns and associated periodicities may be configured based on a practical requirement. A pattern may be a combination of various number of slots in various formats. For example, the pattern may be "DDDDFUU". In this pattern, the 4 DL slots, the single flexible slot, and the 2 UL slots may each form a sub-pool for transmission resource.

In some embodiment, the format, such as DL, UL, and flexible format may also apply to a time block such as a symbol. The symbol may include at least one of:

Orthogonal Frequency Division Multiplexing (OFDM) symbol;

Single Carrier Frequency Division Multiplexing Access (SC-FDMA) symbol; or

Filter Bank Multiple Access (FBMA) symbol.

Using OFDM symbol as an example, each slot may include multiple Orthogonal Frequency Division Multiplexing (OFDM) symbols. Referring to FIG. 4, a slot may include 14 OFDM symbols. In the frequency domain, each symbol may include multiple Resource Blocks (RBs). The number of RBs in each OFDM symbol may depend on, for example, the bandwidth of the cell or the carrier.

In some embodiments, one or more OFDM symbols may form a transmission resource segment (or resource segment). As shown in FIG. 4, a resource segment 404 is formed by OFDM symbols 2-11 in a slot. A resource segment may also be formed by one or more slots, or a mixture of slots and OFDM symbols. For example, in the transmission resource pool formed by slots 0-4, slot 1 and 2 may form a resource segment. In some embodiments, the one or more OFDM symbols, or the one or more slots that form the transmission resource segment are in same format.

In some embodiments, a transmission sub-pool is formed by multiple slots or OFDM symbols and may as well have a transmission direction and format, which are the same as the transmission direction and format of member slots or OFDM symbols in the sub-pool. This is also true for a transmission resource segment. As a summary, each time block (e.g., slot/symbol) may have a format (D, U, or F) and transmission direction (DL, UL, or bi-directional), which may be used to determine a corresponding format or transmission direction for a sub-pool or a transmission resource segment. Further, within each time block, a frequency range (such as a sub-band, resource blocks, etc.) may also be assigned a format. For example, resource blocks 10-20 in slot 1 may be assigned to D format, whereas another resource blocks 70-80 in slot 1 may be assigned to U format. In example embodiments in this disclosure, description may be made using slot/symbol, and the underlying principles apply to a time block in general.

Sub-Band Full Duplex (SBFD)

In an exemplary wireless network operating in TDD mode, as discussed above, the data/signal transmission may follow a certain pattern, such as "DDDFU". The following discussion will be based on this pattern although it will be appreciated that the transmission may follow other various patterns. The discussion will use slot for example purpose, and other time block may apply as well. In the "DDDFU" pattern, slots 0-2 are DL slots, slot 3 is flexible slot, whereas slot 4 is UL slot. The resulting DL and UL traffic is therefore time division duplexed as per the transmission slot pattern. It is overserved that UL transmission has only a single dedicated slot. From a network performance perspective, UL transmission may suffer from excessive latency since the UE is restricted to transmitting in the single dedicated U slot and in the UL resource allocated in the flexible slot. This may lead to performance issue, especially for latency sensitive applications, such as intelligent transport systems, vehicle to vehicle communications, remote surgery, etc. Another factor to consider is that the transmission energy for the UL communication is constrained to the dedicated U slot, and this may lead to sub-optimal or degraded radio coverage.

Figures 5, 6:
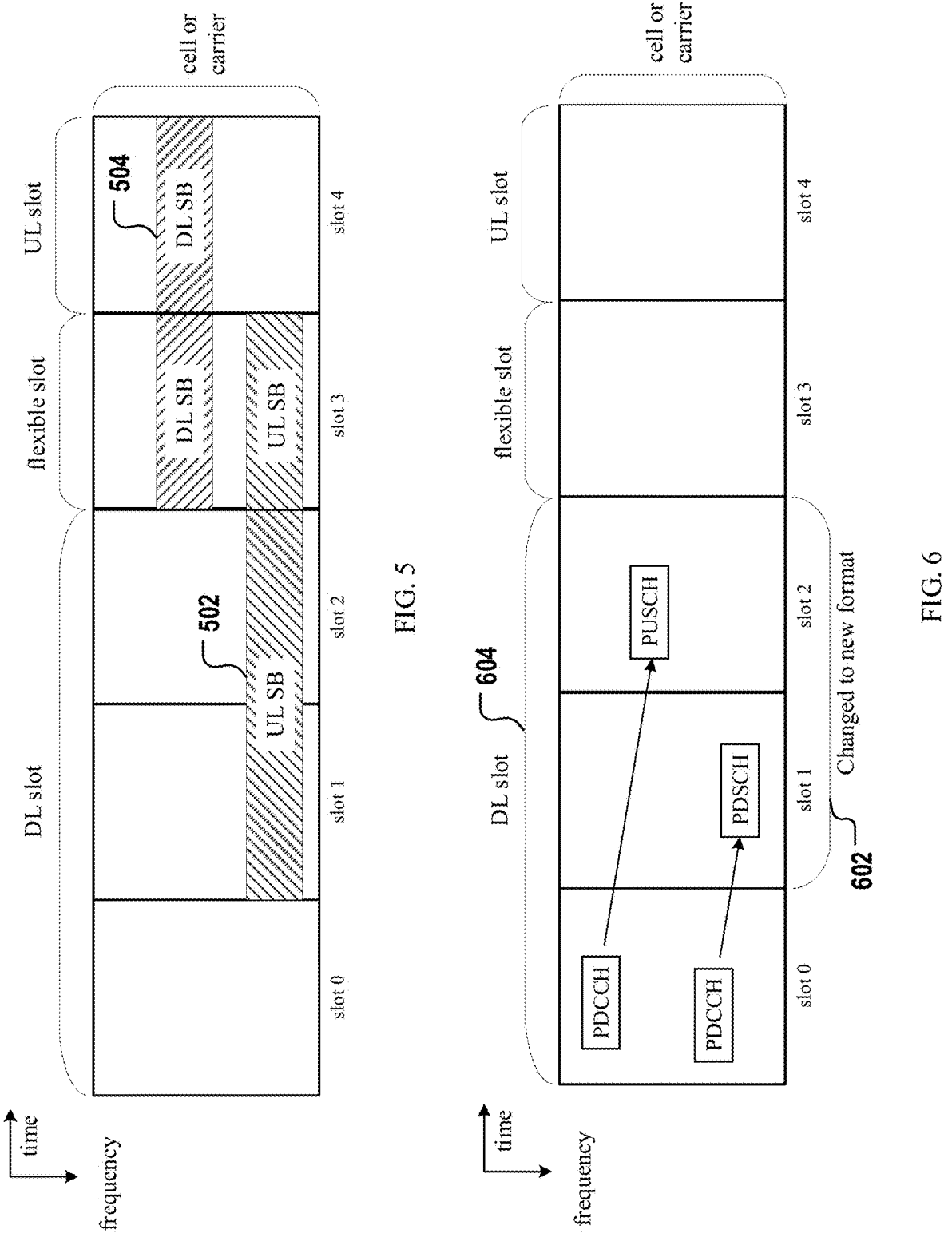
FIG. 5 shows an exemplary Sub-band Duplex implementation.
FIGS. 6-15 show exemplary implementations for re-configuring transmission resource segment(s).

To address the aforementioned issues with regard to latency and transmission energy limitation, one solution is to introduce a Sub-band Full Duplex (SBFD) mode to the wireless network. Referring to FIG. 5, slots 1-2, which are originally dedicated to DL transmission, may be re-configured so that a portion of spectrum resource in slots 1-2 may be allocated to create a UL sub-band (UL SB 502) to support UL transmission, while the rest of spectrum resource still supports DL transmission. Therefore, simultaneous DL and UL transmissions may be achieved in slots 1-2. Likewise, slot 4, which is originally dedicated to UL transmission, may be re-configured and a portion of spectrum resource (DL SB 504) may be allocated to support DL transmission. In this example, slot 0 remains in original format (D) and it is still dedicated to DL transmission. In some embodiments, a sub-band, such as UL SB 502 and DL SB 504, may be formed by one or more resource blocks.

With the addition of SBFD mode, the wireless network may obtain certain level of flexibility for scheduling transmission in one direction using a sub-band in a slot (or slots) originally dedicated to another direction. However, the scheduling for reverse direction traffic (as compared to the direction originally assigned to the slot) is limited to the sub-band allocated. Therefore, scheduling schemes, such as dynamic scheduling (e.g., via Downlink Control Information (DCI)), Configured Scheduling (CG), and Semi-Persistent Scheduling (SPS), may all need to follow this rule. This limitation may also cause a spectrum efficiency issue. For example, for a D slot (originally dedicated for DL transmission) with a sub-band allocated for UL traffic, if there is no UL traffic that needs to be scheduled in the sub-band, but there is DL transmission task which may benefit from extra bandwidth, the sub-band nevertheless may not be allocated for DL transmission, unless whole or partial of the sub-band is claimed back to the associated slot (e.g., via extra configuration signaling). For another example, for a D slot with a sub-band allocated for UL traffic, the DL traffic is light and there is un-used DL resource in the slot. If the UL traffic may benefit from extra bandwidth, the un-used DL resource nevertheless may not be allocated for UL transmission.

Another potential issue with SBFD is overall system complexity. This has to do with signaling overhead involved for configuring the sub-band as the base station needs to indicate to the UE about the sub-band configuration. Additionally, complex operation rules have to be defined to standardize UE and/or base station behaviors related to sub-band. For example, existing scheduling schemes, such as dynamic scheduling, CG, and SPS will have to be modified to accommodate the sub-band.

In this disclosure, various embodiments are disclosed aiming to enhance the flexibility of transmission resource scheduling, while leveraging existing resource scheduling schemes and minimizing signaling overhead.

Frame Structure and Slot Format Configuration

In a wireless network, various signaling and/or messages may be provided to configure a time block (e.g., frame, slot, symbol, etc) format, including the pattern of the transmission resource pool as described in earlier section (e.g., the "DDDFU" pattern as shown in FIG. 4).

The signaling may include cell specific signaling, for example, tdd-UL-DL-ConfigurationCommon. This signaling applies to all the UEs in one cell. Turning back to FIG. 4, this signaling may indicate to the UEs: a periodicity of the transmission resource pool, a format (i.e., D, U, or F) of each slot in the transmission resource pool.

The indication/configuration described above uses slot as a unit in time domain. In some embodiments, the same underlying principle may apply to an OFDM symbol level to gain finer granularities. For example, the periodicity may be presented as a number of OFDM symbols (or equivalent time period corresponding to the number of OFDM symbols). Similarly, the format may also apply to the OFDM symbol. That is, the base station may indicate to the UE a format for each OFDM symbol, whether the symbol is for DL, UL, or flexible purpose.

The signaling may also include UE specific signaling, for example, tdd-UL-DL-ConfigurationDedicated. In some embodiments, the UE specific signaling may override the configuration indicated by the cell specific signaling.

In some embodiments, in case a UE is not provided with either a cell specific signaling or a UE specific signaling, the UE may assume that all slots and/or OFDM symbols are in flexible format.

Once a slot (or slots) or an OFDM symbol (or OFDM symbols) is configured as flexible format, the base station may schedule transmission resource in the slot or the OFDM symbol with desired direction, whether the direction is DL or UL. For example, referring to FIG. 4, slot 3 is configured as an F slot. In the time domain, the base station may assign this whole slot or at least one OFDM symbol in this slot for UL transmission. In the frequency domain, the resource assignment may occupy all the resources blocks in the whole slot (or the at least one OFDM symbol), or just a portion of them. For example, assuming there is one single carrier in frequency domain which includes 100 resource blocks, in one example assignment, resource blocks 11-20 out of these 100 resource blocks in whole slot 3 may be assigned for UL transmission. In another assignment, resource blocks 50-80 out of these 100 resource blocks in OFDM symbols 8-10 of slot 3 may be assigned for UL transmission.

By using signaling described above, a transmission resource may be configured with an initial configuration including an initial pattern. Still referring to FIG. 4, the transmission resource pool 402 may be configured with an initial pattern "DDDFU" using aforementioned signaling scheme.

In some implementations, the transmission resource may be limited in a single cell, or a single carrier.

Re-Format Transmission Resource

After a transmission resource pool is configured with an initial pattern, each time block (e.g., slot, symbol, etc.) in the transmission resource pool is assigned to an initial format, such as D (for DL direction), F (flexible for both DL and UL direction), or U (for UL direction). The initial format may be re-configured to a different format, for example, by the base station. In some embodiments, based on information such as traffic characteristics, Quality of Service (QoS) requirement, service type, and so on, the base station may send a message to the UE, to re-format at least one slot or at least one symbol in the transmission resource pool. Turning back to FIG. 4, the initial format of slot 1 is DL (D). In this disclosure, without affecting other slots, the base station may re-format slot 1 to an enhanced flexible slot format which may support both DL and UL transmission as a flexible does, and indicate the updated format of slot 1 to the UE.

In this disclosure, enhanced flexible format may further include various enhancement to the flexible format, which include at least:

the enhanced flexible format provides transmission direction conflict resolution when both DL and UL transmissions are scheduled in a same time block;

the enhanced flexible format inherits a default format from an initial format of the associated transmission resource; and the enhanced flexible format provides a flexible Band-width Part (BWP) configuration.

More descriptions on these enhancements will be described in later sections.

In some embodiments, in addition to use a signal/message to explicitly re-format a slot and/or OFDM symbol, some predefined rules may be used. For example, when certain pre-condition is met, such as the UL/DL traffic is above a threshold, format of at least one slot/OFDM symbol may be changed to enhanced flexible format. Further, a selection mechanism may also be defined under these rules for selecting the slot(s) and/or symbol(s) intended to be re-formatted. These predefined rules may be coordinated and agreed upon between the base station and the UE.

As a summary, in this disclosure, a two-step procedure is introduced to first initialize the format of a transmission resource pool, and then certain slot and/or OFDM symbol may be re-formatted to an enhanced flexible format:

Step 1:

The base station may send a first signaling to the UE, to initialize the format of a transmission resource pool. The first signaling may include a cell specific message, or a UE specific message.

Step 2:

Format of certain slot and/or OFDM symbol in the transmission resource pool may be re-configured, either via a second signaling, or by predefined rules.

In following embodiments, unless otherwise specified, a transmission resource pool including 5 slots (using as exemplary time block) and being configured with an initial "DDDFU" pattern is used. For example, the base station may configure the pattern via cell specific and/or UE specific signaling as described above. Other parameters, such as periodicity, may also be configured. Note that this particular pattern is for exemplary purpose only. The same underlying principles may apply to other patterns. Further, a pattern may apply to multiple slots, as well as multiple OFDM symbols. That is, when the pattern "DDDFU" applies to slots, there are 5 slots following this pattern; when "DDDFU" applies to OFDM symbols, there are 5 OFDM symbols following this pattern.

Embodiment 1

Referring to FIG. 6, slots 1-2, which form a transmission resource segment 602 inside sub-pool 604, are initially configured to be in "D" format. These two slots are then re-formatted to an enhanced flexible format.

In one implementation, when a transmission resource sub-pool is formed by resources (e.g., slot, OFDM symbol) in "D" format, a transmission resource segment (within the sub-pool) to be re-formatted should start from the last OFDM symbol, or the last slot in the sub-pool. For example, in FIG. 6, slots 0-2 form a sub-pool 604 in "D" format, re-formatting a portion of the sub-pool may need to start from slot 2, or last OFDM symbol of slot 2. For another example, if only 8 OFDM symbols need to be re-formatted to a flexible format, then the last 8 OFDM symbols in the sub-pool, which are the last 8 symbols in slot 2 will be selected for re-formatting.

Exemplarily, there is one Physical Downlink Control Channel (PDCCH) in slot 0, which schedules a Physical Downlink Shared Channel (PDSCH) for the UE in slot 1. The UE receives PDSCH in slot 1.

Exemplarily, there is another PDCCH in slot 0, which schedules a Physical Uplink Shared Channel (PUSCH) for the UE in slot 2. The UE receives PUSCH in slot 2. In this case, the scheduled PUSCH has a different transmission direction compared with the original transmission direction of slot 2. In one implementation, rest resource in slot 2 may still be available for DL transmission.

Embodiment 2

Figures 7, 8:
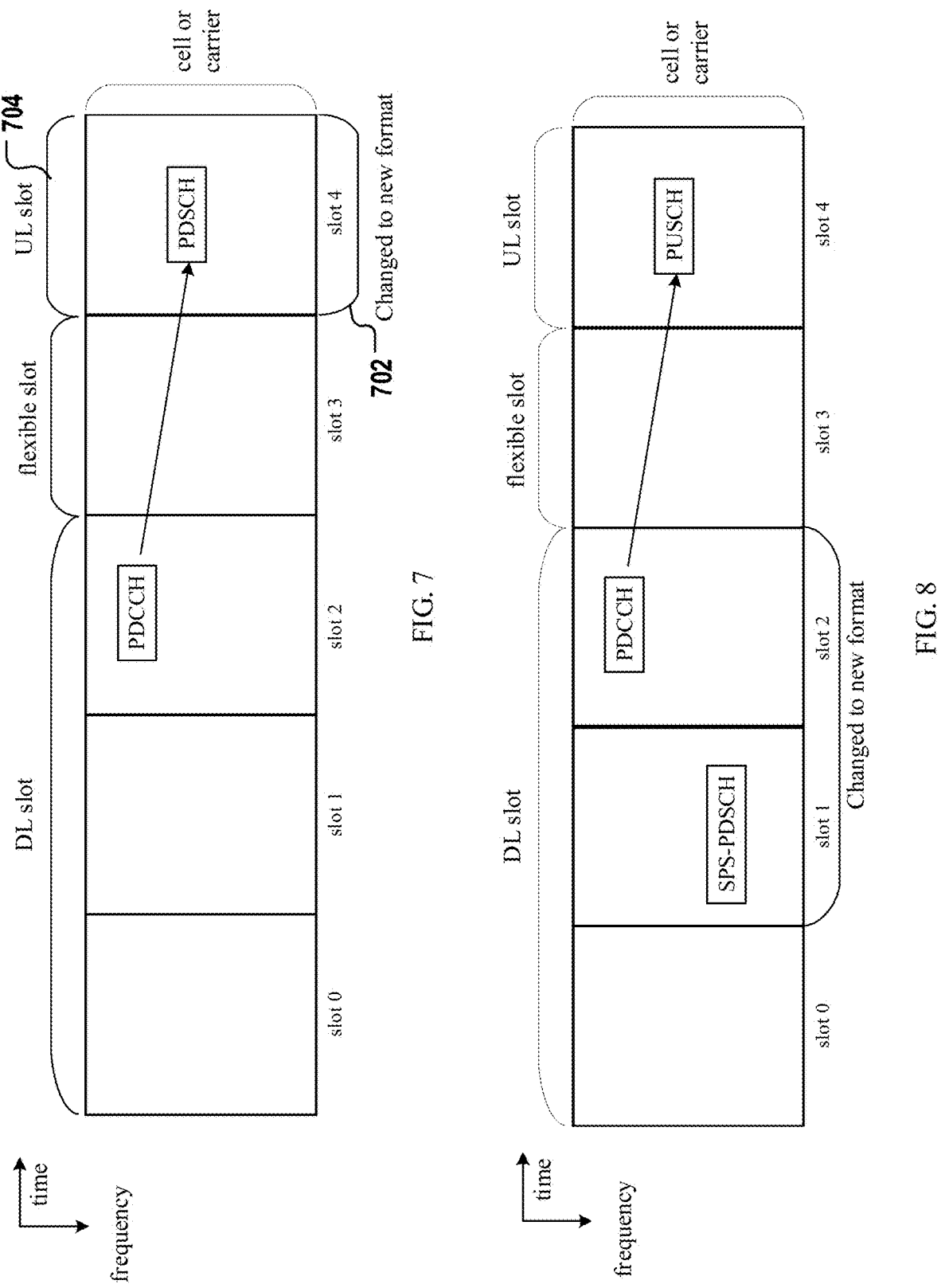

Referring to FIG. 7, slot 4, which forms a transmission resource segment 702 inside sub-pool 704), is initially configured to be in "U" format. Slot 4 is then re-formatted to an enhanced flexible format. Note that a transmission resource segment may occupy whole or partial of a sub-pool (i.e., transmission resource segment is a subset of a sub-pool, a subset may be a portion or whole of its parent set). In this example, the transmission resource segment 702 occupies the whole sub-pool 704.

In one implementation, when a transmission resource sub-pool is formed by resources (e.g., slot, OFDM symbol) in "U" format, a transmission resource segment (within the sub-pool) to be re-formatted should start from the first OFDM symbol, or the first slot in the sub-pool. For example, in FIG. 7, slot 4 forms a sub-pool in "U" format. If only 8 OFDM symbols in the sub-pool need to be re-formatted to a flexible format, then the first 8 OFDM symbols in the sub-pool, which are the first 8 symbols in slot 4 will be selected for re-formatting. For another example, not shown in FIG. 7, assuming slots n and (n+1) form a sub-pool in "U" format, if one slot in the sub-pool needs to be reformatted to enhanced flexible format, then slot n will be selected for re-formatting.

Exemplarily, there is one PDCCH in slot 2, which schedules a PDSCH in slot 4. UE receives the PDSCH in slot 4.

Embodiment 3

Referring to FIG. 8, slots 1-2 are initially configured to be in "D" format and then re-configured to an enhanced flexible format.

UE may receive data channel which is schedules via SPS. For example, as shown in FIG. 8, there is a SPS-PDSCH occasion in slot 1. UE receives SPS-PDSCH in slot 1.

Exemplarily, there is a PDCCH search space configured in slot 2. UE may perform blind decoding of PDCCH in the search space. UE detects a PDCCH which is transmitted in the search space, and the PDCCH schedules a PUSCH in slot 4. UE may transmit the PUSCH in slot 4.

Embodiment 4

Figure 9:
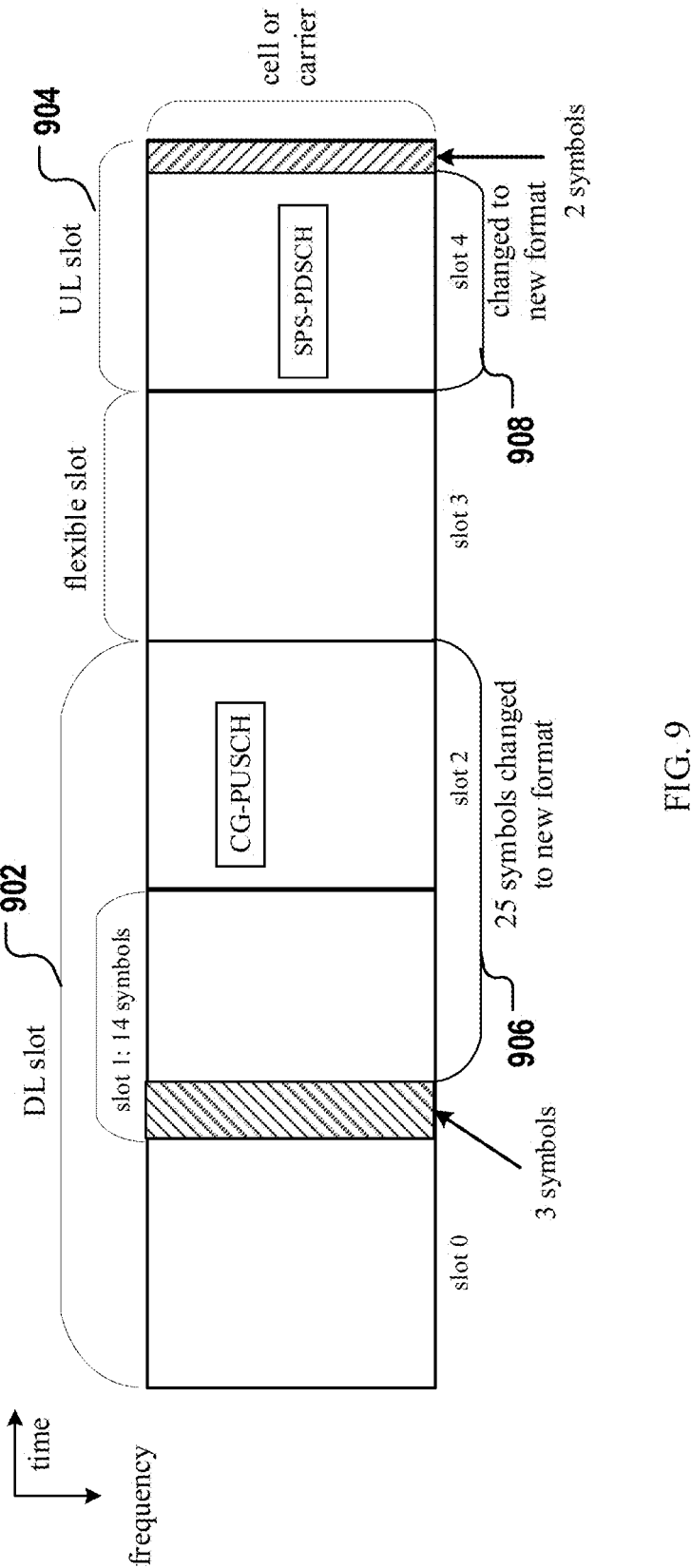

Referring to FIG. 9, slots 0-2, which form a transmission resource sub-pool 902, are initially configured to be in "D" format. Slot 4, which forms a transmission resource sub-pool 904, is initially configured to be in "U" format.

Similar to embodiment 1, when a transmission resource sub-pool is formed by resources in "D" format, a transmission resource segment (within the sub-pool) to be re-formatted should be counted from the last OFDM symbol, or the last slot in the sub-pool. As an example, in FIG. 9, sub-pool 902, a transmission resource segment 906 with 25 OFDM symbols needs to be re-formatted to a flexible format. The last 11 symbols in slot 1 and all symbols in slot 2, which are the last 25 symbols in sub-pool 902, are selected as the to-be-reconfigured transmission resource segment.

When a transmission resource sub-pool is formed by resources in "U" format, a transmission resource segment (within the sub-pool) to be re-formatted should be counted from the first OFDM symbol, or the first slot in the sub-pool. As an example, in FIG. 9, in sub-pool 904, a transmission resource segment 908 with 12 OFDM symbols needs to be re-formatted to an enhanced flexible format. The first 12 symbols in slot 4, which are also the first 12 symbols in sub-pool 904, are selected as the to-be-reconfigured transmission resource segment.

After the re-format as described above, there is a SPS-PDSCH occasion in slot 4, UE receives SPS-PDSCH in slot 4. Note that slot 4 was originally configured as "U" format. After the re-format, slot 4 also supports DL transmission.

There is a CG-PUSCH occasion in slot 2, UE transmit CG-PUSCH in slot 2. Note that slot 2 was originally configured as "D" format. After the re-format, slot 2 also supports UL transmission.

Embodiment 5

Figure 10:
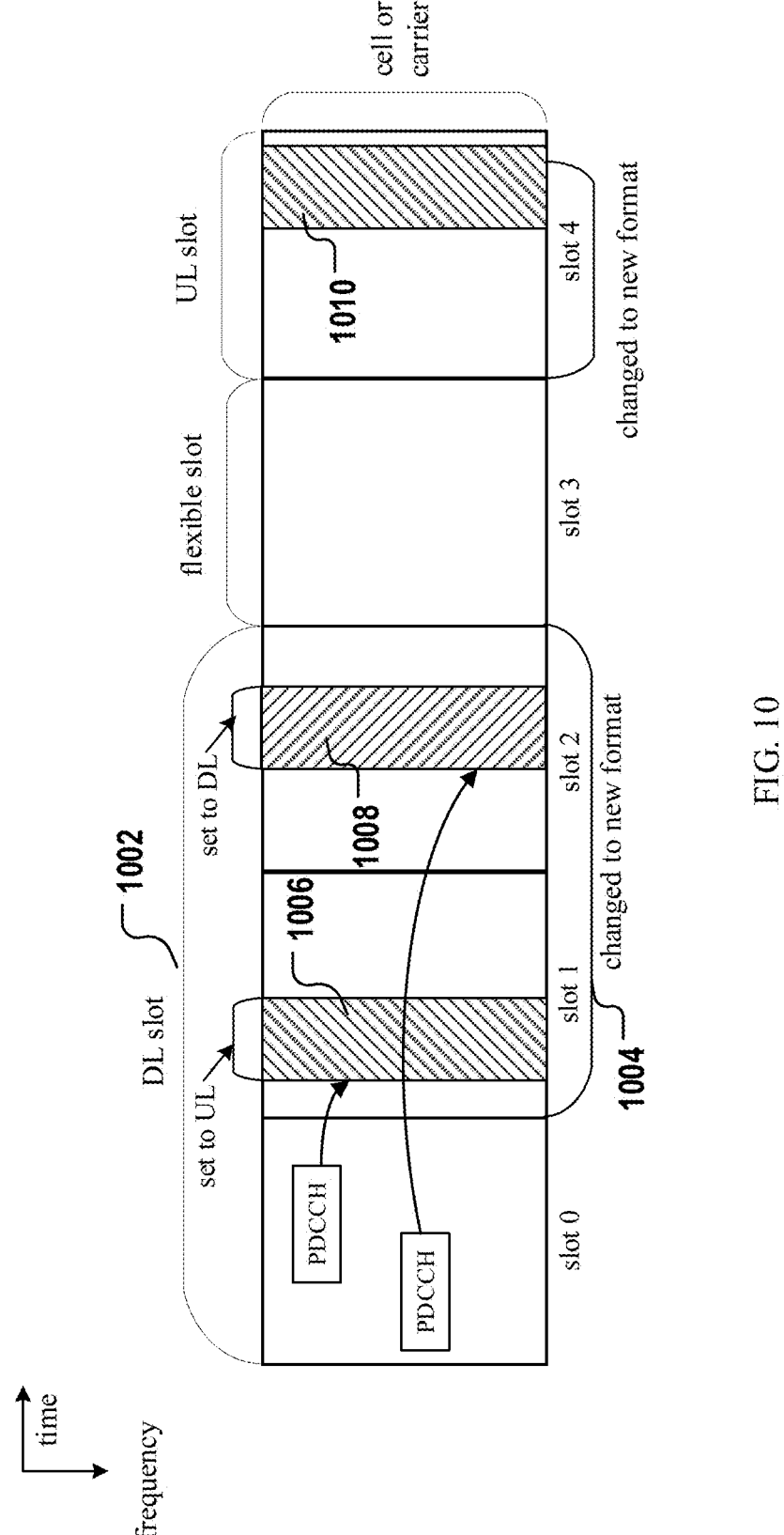

Referring to FIG. 10, slots 0-2, which form a transmission resource sub-pool 1002, are initially configured to be in "D" format. Slots 1 and 2, which form a transmission resource segment 1004, are re-configured to a flexible format, which are the last 28 OFDM symbols (i.e., last 2 slots) of sub-pool 1002.

In one implementation, once a transmission resource segment is re-configured to an enhanced flexible format, the serving direction (DL or UL) of the transmission resource segment (and any subset therein) may be considered as indeterminate, and further signaling/message from the base station is required to indicate the serving direction. For example, as shown in FIG. 10, two PDCCHs in slot 0 are used to indicate the direction of two resource subsets in transmission resource segment 1004. The first PDCCH indicates that 5 symbols in slot 1 (resource subset 1006) serve UL, and the second PDCCH indicates that 5 symbols in slot 2 (resource subset 1008) serve DL. In this disclosure, a transmission resource subset in a transmission resource segment may be less than or equal to the transmission resource segment.

In one implementation, once a transmission resource segment is re-configured to an enhanced flexible format, the serving direction (DL or UL) of the transmission resource segment may inherit the direction defined by the original format of the transmission resource segment. That is, if no further signaling/messaging indicating the serving direction is sent by the base station (to override the original format), the serving direction of the transmission resource segment defaults to the direction defined by the original format of the transmission resource segment. This default serving direction may be overridden by further signaling/messaging from the base station, if a transmission in a reverse direction is anticipated. As an example, with reference to FIG. 10, slot 4 was originally configured as "U" format and is re-configured to an enhanced flexible format. Without further signaling/messaging from the base station, transmission resource segment 1010 (and any transmission resource subset therein) defaults to an UL direction. Only if segment 1010 (or a subset of it) is needed to be used for DL transmission, or to be re-formatted to a DL format, a signaling/messaging is required to override the default UL direction. In this embodiment, once a resource is re-formatted to enhanced flexible format, a subset within it may be assigned to either a DL or a UL format. For example, the subset may be periodic and is set to DL format, and the UE is expected to periodically turn on its hardware circuitry for DL reception in this subset.

For another example. a DL transmission such as a PDSCH may be scheduled in the subset for a one-shot DL transmission.

Embodiment 6

Figure 11:
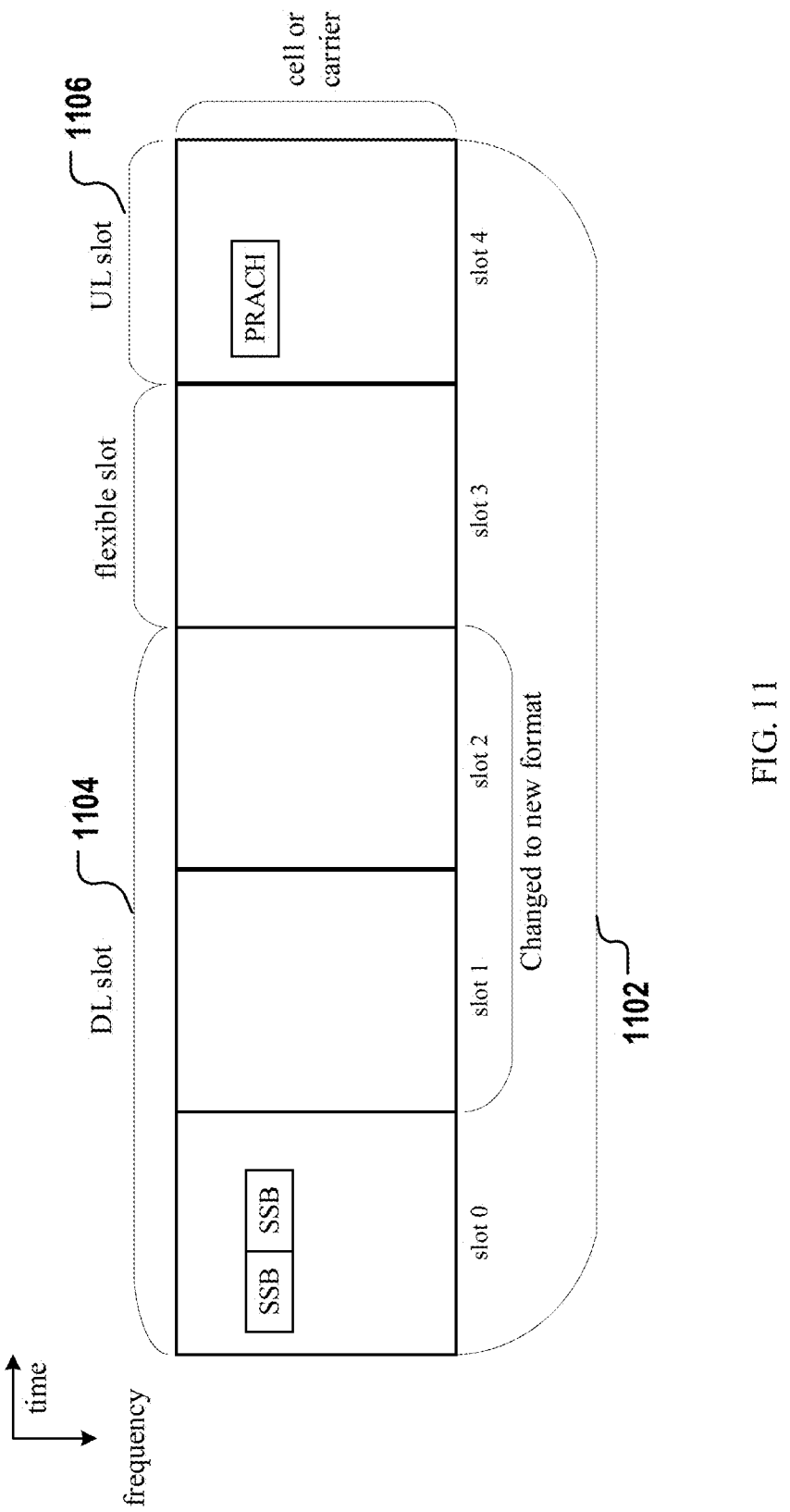

Referring to FIG. 11, a transmission resource pool 1102 is formed by slots 0-4. Within this transmission resource pool 1102, some resources need to be re-configured to an enhanced flexible format, and certain rules need to be followed for the selection of to-be-reconfigured resources.

As a general rule, a resource is not allowed to be re-formatted to an enhanced flexible format, if the particular resource is scheduled for one of:

cell specific configuration;

semi-static configuration;

periodic configuration; or data or signal with high priority.

For example, in FIG. 11, sub-pool 1104 (slots 0-2) and sub-pool 1106 (slot 4) are two candidate sub-pools from which the to-be-reconfigured resources may be selected. In sub-pool 1104, there are two Synchronization Signal Blocks (SSBs) scheduled in slot 0. According to the selection rule, if a slot has SSB scheduled, this slot may not be selected as the to-be-reconfigured resource. In sub-pool 1106, there is a Physical Random Access Channel (PRACH) scheduled in slot 4. Slot 4 may not be selected as the to-be-reconfigured resource. Therefore, only slots 1-2 in sub-pool 1104 may be selected and re-configured to an enhanced flexible format.

Embodiment 7

Figures 12, 13:
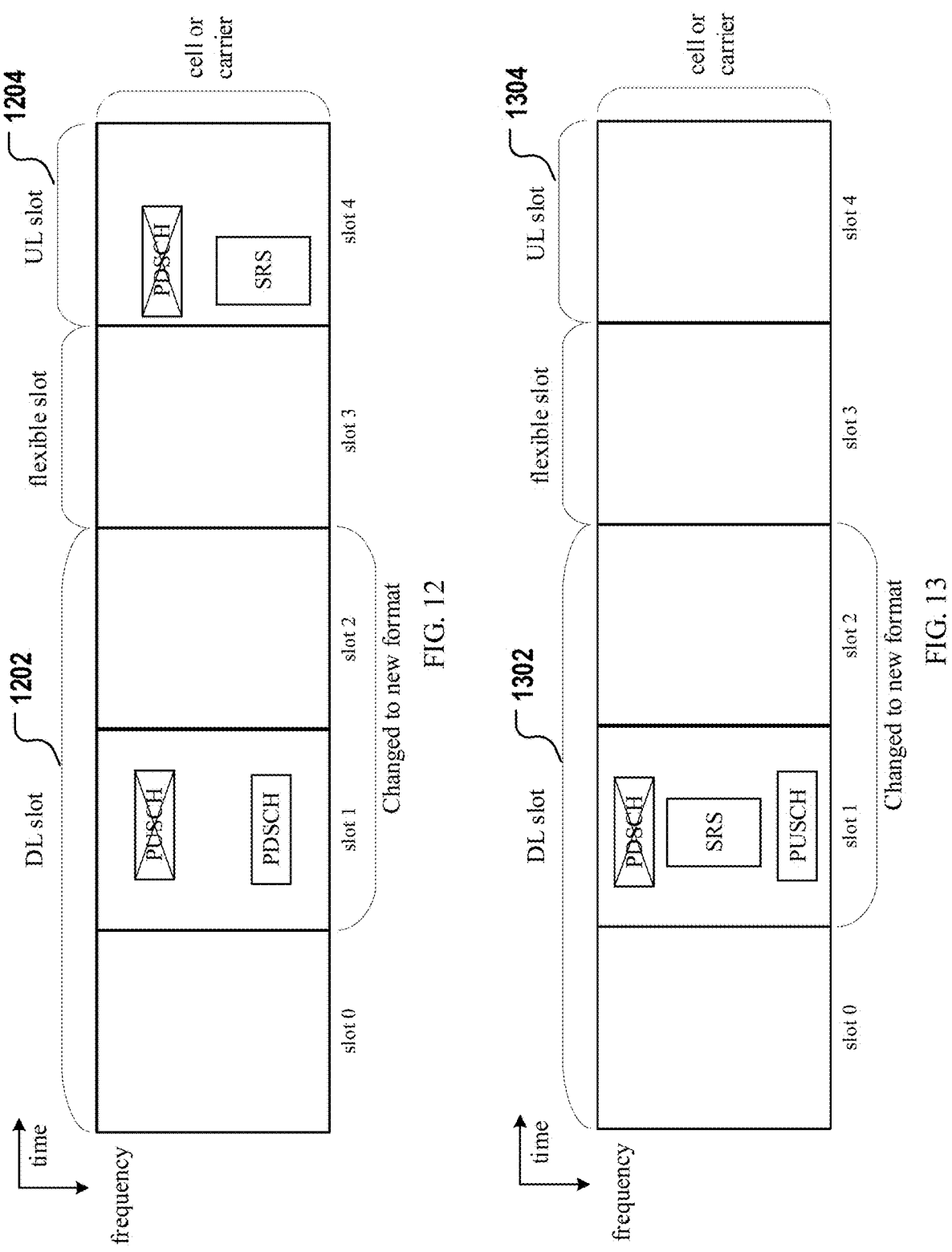

Referring to FIG. 12, in this embodiment, slots 1-2 are re-configured to an enhanced flexible format, which include the last 28 OFDM symbols (i.e., last 2 slots) in transmission resource sub-pool 1202. Slot 4 is re-configured to an enhanced flexible format, which includes the first 14 OFDM symbols in transmission resource sub-pool 1204.

In one example, there are PDSCH (e.g., SPS-PDSCH, or dynamically scheduled PDSCH) and PUSCH (e.g., CG-PUSCH, or dynamically scheduled PUSCH) in slot 1. That is, there are both DL and UL transmissions scheduled in slot 1. Therefore, there is a conflict with respect to transmission directions. As slot 1 is originally configured as "D" format for DL direction, PDSCH is considered to have higher priority than PUSCH. In this case, UE will drop the UL transmission and receive the DL transmission. That is, transmission direction consistent with the original format (before the re-format) takes precedence.

In another example, there are PDSCH (e.g., SPS-PDSCH, or dynamically scheduled PDSCH) and SRS in slot 4. As slot 4 is originally configured as "U" format for UL direction, SRS is considered to have higher priority than PDSCH. In this case, UE will drop the reception of the DL transmission and proceed with the UL transmission. That is, transmission direction consistent with the original format of the slot takes precedence.

Embodiment 8

Referring to FIG. 13, in this embodiment, slots 1-2 are re-configured to an enhanced flexible format, which include the last 28 OFDM symbols (i.e., last 2 slots) in transmission resource sub-pool 1302. Slot 4 is re-configured to an enhanced flexible format, which includes the first 14 OFDM symbols in transmission resource sub-pool 1304.

There are PDSCH (e.g., SPS-PDSCH, or dynamically scheduled PDSCH), PUSCH (e.g., CG-PUSCH, or dynamically scheduled PUSCH) and SRS in slot 1. It is observed that there are more UL signal/channel (i.e., PUSCH and SRS) than DL signal/channel (i.e., PDSCH) in slot 1. In this case, UL transmission is considered to have higher priority than DL reception due to its more occurrences. In this case, UE will drop the reception of the DL transmission and proceed with the UL transmissions.

Embodiment 9

Figures 14, 15:
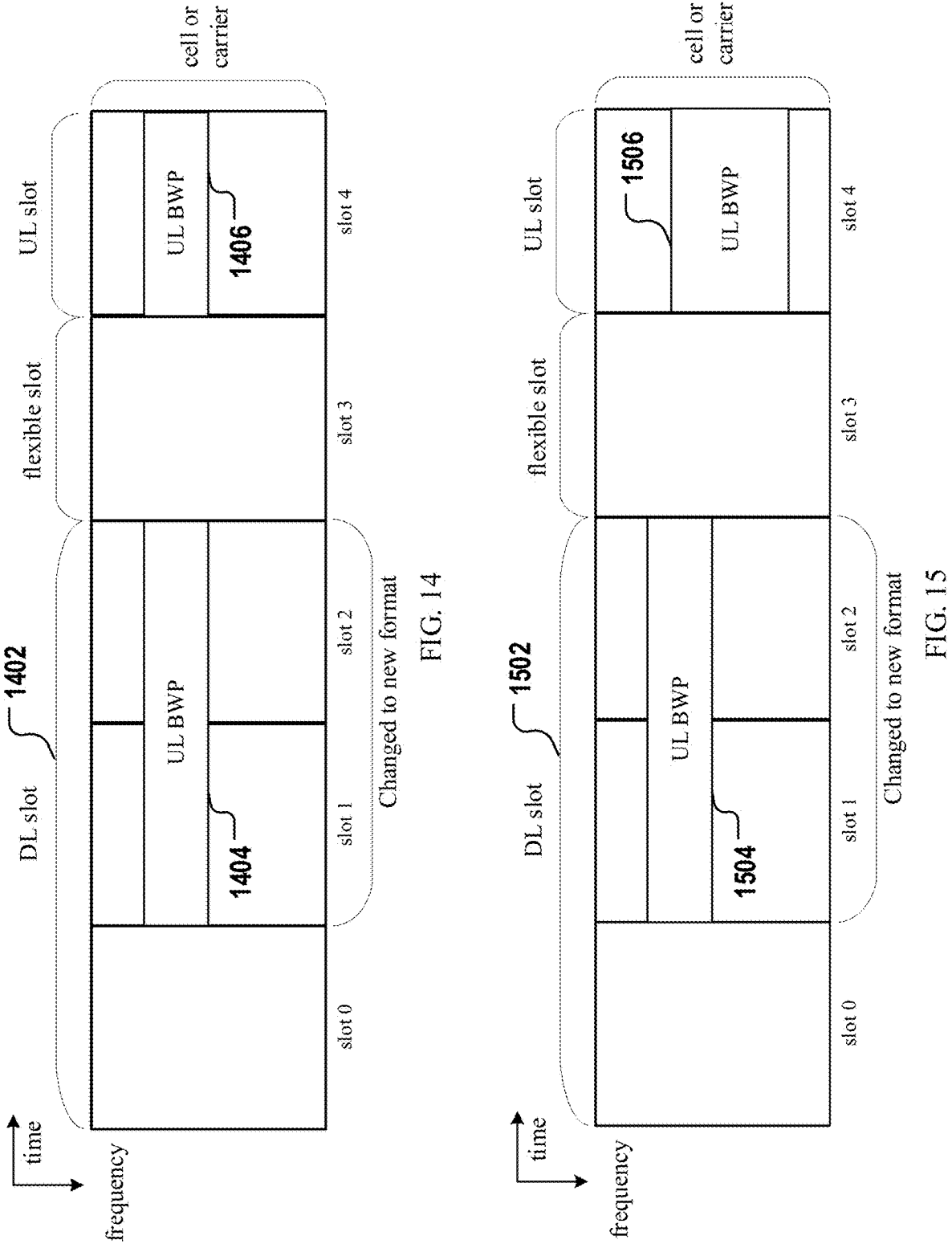

Referring to FIG. 14, in this embodiment, slots 1-2 are re-configured to an enhanced flexible format, which include the last 28 OFDM symbols (i.e., last 2 slots) in transmission resource sub-pool 1402. Slot 4 stays in its original "U" format (for UL).

There is an uplink Bandwidth Part (BWP) 1404 configured in slots 1-2. There is another uplink BWP 1406 configured in slot 4. In this embodiment, an uplink BWP in a re-configured transmission resource segment shares a same BWP configuration as another uplink BWP in another transmission resource segment, where the another transmission resource segment is in its original format (without being re-formatted). For example, uplink BWP 1404 resides in a re-configured transmission resource segment formed by slots 1-2 and may share a same BWP configuration as uplink BWP 1406, which resides in a transmission resource segment formed by slot 4 and is in its original "U" format.

Likewise, a downlink BWP in a re-configured transmission resource segment shares a same BWP configuration as another downlink BWP in another transmission resource segment, where the another transmission resource segment is in its original "D" (for DL) format.

In some implementations, the BWP configuration includes at least one of:

a bandwidth;

a center frequency;

a configuration of a control channel, the control channel comprising at least one of a Physical Uplink Control Channel (PUCCH), or a Physical Downlink Control Channel (PDCCH);

a configuration of a data channel, the data channel comprising at least one of a Physical Uplink Shared Channel (PUSCH), or a Physical Downlink Shared Channel (PDSCH); or a numerology.

The configuration of a control channel includes at least one of: a search space configuration; or a Control Resource Set (CORESET) configuration.

In some implementations, the BWPs as described above are active BWPs.

In this embodiment, a UE may copy a BWP configuration for a BWP in a re-configured transmission resource segment directly from an existing BWP, without the need of further signaling from the base station.

Embodiment 10

This is embodiment is contrary to embodiment 9. Referring to FIG. 15, in this embodiment, slots 1-2 are re-configured to an enhanced flexible format, which include the last 28 OFDM symbols (i.e., last 2 slots) in transmission resource sub-pool 1402. Slot 4 stays in its original "U" format (for UL).

There is an uplink Bandwidth Part (BWP) 1504 configured in slots 1-2. There is another uplink BWP 1506 configured in slot 4. In this embodiment, an uplink BWP in a re-configured transmission resource segment has a different BWP configuration compared with another uplink BWP in another transmission resource segment, where the another transmission resource segment is in its original format. For example, uplink BWP 1504 resides in a re-configured transmission resource segment formed by slots 1-2 and has a different BWP configuration compared with uplink BWP 1506, which resides in a transmission resource segment formed by slot 4 and is in its original "U" format.

Likewise, a downlink BWP in a re-configured transmission resource segment has a different BWP configuration compared with another downlink BWP in another transmission resource segment, where the another transmission resource segment is in its original "D" (for DL) format.

The BWP configuration is described in embodiment 9, and the detail is skipped herein.

In above embodiments, the transmission resource may be limited in a single cell, or a single carrier.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution may be practiced without one or more of the specific features or advantages of a particular embodiment. In other instances, additional features and advantages may be recognized in certain embodiments that may not be present in all embodiments of the present solution.

What is claimed is:

1. A method for wireless communication, performed by a wireless device, the method comprising:
    determining an initial format for each time block of a transmission resource pool comprising at least one sub-pool including a first sub-pool, wherein the initial format indicate an initial transmission direction configuration for the each time block, wherein:
        the initial format of the each time block of the transmission resource pool comprises one of: a downlink (DL) format, an uplink (UL) format, and a flexible format;
        an initial format of each time block in each of the at least one sub-pool is same;
        an initial format of the first sub-pool is the DL format or the UL format; and
        an initial transmission direction of the first sub-pool is consistent with the initial format of the first sub-pool; and
    determining, that a transmission resource segment in the first sub-pool is re-configured from an initial format to an enhanced flexible format, wherein the initial format of the transmission resource segment is same as the initial format of the first sub-pool, and an initial transmission direction of the transmission resource segment is same as an initial transmission direction of the first sub-pool, wherein:
    the DL format indicates that an associated transmission resource is dedicated to DL transmission;
    the UL format indicates that the associated transmission resource is dedicated to UL transmission;
    the flexible format indicates that the associated transmission resource is capable of both DL transmission and UL transmission; and
    the enhanced flexible format comprises at least one of following enhancements to the flexible format:
        the enhanced flexible format provides transmission direction conflict resolution when both DL and UL transmissions are scheduled in a same time block;
        the enhanced flexible format inherits a default format from an initial format of the associated transmission resource; and
        the enhanced flexible format provides a flexible Bandwidth Part (BWP) configuration.

2. The method of claim 1, wherein at least one of following conditions is met:

a unit for the each time block of the transmission resource pool comprises at least one of:
        a time slot; or
        a symbol;
    the transmission resource pool is configured to repeat periodically in a time domain;
    any two adjacent sub-pools in the at least one sub-pool have different initial formats;
    the transmission resource segment comprises n symbols with n being a positive integer, the n symbols are continuous in time domain, and a type of the n symbols comprising at least one of:
        Orthogonal Frequency Division Multiplexing (OFDM) symbol;
        Single Carrier Frequency Division Multiplexing Access (SC-FDMA) symbol; or
        Filter Bank Multiple Access (FBMA) symbol.

3. The method of claim 2, wherein:
    in response to the initial format of the first sub-pool being the DL format, the n symbols are last n symbols in the first sub-pool; and
    in response to the initial format of the first sub-pool being the UL format, the n symbols are first n symbols in the first sub-pool.

4. The method of claim 1, wherein determining the initial format for the each time block of the transmission resource pool comprises:
    receiving a first message from a network element, wherein the first message comprises at least one of: a tdd-UL-DL-ConfigurationCommon message; or a tdd-UL-DL-ConfigurationDedicated message; and
    determining the initial format for the each time block of the transmission resource pool based on the first message.

5. The method of claim 1, wherein determining, that the transmission resource segment is re-configured from the initial format to the enhanced flexible format comprises:
    receiving a second message from a network element; and
    determining, based on the second message, that the transmission resource segment is re-configured from the initial format to the enhanced flexible format.

6. The method of claim 1, wherein determining, that the transmission resource segment is re-configured from the initial format to the enhanced flexible format comprises:
    determining, that the transmission resource segment is re-configured from the initial format to the enhanced flexible format based on a predefined rule.

7. The method of claim 1, further comprising receiving an indication from a network element, the indication indicating:
    a subset of the transmission resource segment; and at least one of:
    a format of the subset of the transmission resource segment comprising one of:
        DL format; or
        UL format; or
    a transmission scheduled for the subset of the transmission resource segment comprising one of:
        a DL transmission; or
        a UL transmission,
wherein the indication is sent via at least one of:
    a dynamic scheduling message comprising a Downlink Control Information (DCI) message;
    a semi-static configuration message;
    a DL Semi Persistent Scheduling (SPS) scheduling message; or
    a UL Configure Grant (CG) scheduling message.

8. The method of claim 7, wherein the indication indicates at least one of:

a time domain information of the subset of the transmission resource segment; or a frequency domain information of the subset of the transmission resource segment.

9. The method of claim 1, further comprising:

in response to receiving an indication from a network element indicating that a subset of the transmission resource segment in a time domain and a frequency domain is scheduled with a transmission, the scheduled transmission comprising a DL transmission or an UL transmission, and a direction of the scheduled transmission being different from the initial transmission direction of the first sub-pool, performing a transmitting task or a receiving task using the subset of the transmission resource segment, in a direction which is consistent with the direction of the scheduled transmission.

10. The method of claim 1, further comprising:

in response to no indication being received indicating a subset of the transmission resource segment is scheduled with a UL transmission or a DL transmission or is configured to a DL or a UL format, determining that a transmission direction associated with the subset follows the initial transmission direction of the first sub-pool.

11. The method of claim 1, further comprising:

determining, that there is at least one DL transmission and at least one UL transmission scheduled at a same time block located in the transmission resource segment;

in response to the initial transmission direction of the transmission resource segment is DL, dropping the at least one scheduled UL transmission, and receiving the at least one DL transmission; and in response to the initial transmission direction of the transmission resource segment is UL, dropping the at least one scheduled DL transmission, and transmitting the at least one UL transmission.

12. The method of claim 1, further comprising:

determining, that there are j DL transmissions and k UL transmissions scheduled at a same OFDM symbol located in the transmission resource segment, j and k being positive integer;

in response to j being greater than k, dropping the k UL transmissions, and receiving the j DL transmissions; and in response to j being less than k, dropping the j DL transmissions, and transmitting the k UL transmissions.

13. The method of claim 1, wherein the transmission resource segment comprises a first BWP of DL or UL, the method further comprising:

determining that a BWP configuration of the first BWP is same as a second BWP in a second sub-pool of the at least one sub-pool, wherein the second sub-pool has an initial direction which is same as a direction associated with the first BWP, the BWP configuration comprising at least one of:

a bandwidth;

a center frequency;

a configuration of a control channel, the control channel comprising at least one of a Physical Uplink Control Channel (PUCCH), or a Physical Downlink Control Channel (PDCCH);

a configuration of a data channel, the data channel comprising at least one of a Physical Uplink Shared Channel (PUSCH), or a Physical Downlink Shared Channel (PDSCH); or a numerology, wherein the configuration of the control channel comprises at least one of: a search space configuration; or a Control Resource Set (CORESET) configuration.

14. The method of claim 1, wherein the transmission resource segment comprises a first BWP for DL or UL, the method further comprising:

determining that a BWP configuration of the first BWP is different from a second BWP in a second sub-pool of the at least one sub-pool, wherein the second sub-pool has an initial direction which is same as a direction associated with the first BWP.

15. A method for wireless communication, performed by a network element, the method comprising:

determining an initial format for each time block of a transmission resource pool comprising at least one sub-pool including a first sub-pool, wherein the initial format indicate an initial transmission direction configuration for the each time block, wherein:

the initial format of the each time block of the transmission resource pool comprises one of: a downlink (DL) format, an uplink (UL) format, and a flexible format;

an initial format of each time block in each of the at least one sub-pool is same;

an initial format of the first sub-pool is the DL format or the UL format; and an initial transmission direction of the first sub-pool is consistent with the initial format of the first sub-pool; and determining, that a transmission resource segment in the first sub-pool is re-configured from an initial format to an enhanced flexible format, wherein the initial format of the transmission resource segment is same as the initial format of the first sub-pool, and an initial transmission direction of the transmission resource segment is same as an initial transmission direction of the first sub-pool, wherein:

the DL format indicates that an associated transmission resource is dedicated to DL transmission;

the UL format indicates that the associated transmission resource is dedicated to UL transmission;

the flexible format indicates that the associated transmission resource is capable of both DL transmission and UL transmission; and the enhanced flexible format comprises at least one of following enhancements to the flexible format:

the enhanced flexible format provides transmission direction conflict resolution when both DL and UL transmissions are scheduled in a same time block;

the enhanced flexible format inherits a default format from an initial format of the associated transmission resource; and the enhanced flexible format provides a flexible Bandwidth Part (BWP) configuration.

16. The method of claim 15, wherein at least one of following conditions is met:

a unit for the each time block of the transmission resource pool comprises at least one of:

a time slot; or a symbol;

the transmission resource pool is configured to repeat periodically in a time domain;

any two adjacent sub-pools in the at least one sub-pool have different initial formats;

the transmission resource segment comprises n symbols with n being a positive integer, the n symbols are continuous in time domain, and a type of the n symbols comprising at least one of:

Orthogonal Frequency Division Multiplexing (OFDM) symbol;

Single Carrier Frequency Division Multiplexing Access (SC-FDMA) symbol; or

Filter Bank Multiple Access (FBMA) symbol.

17. A wireless network node comprising a memory for storing computer instructions and a processor in communication with the memory, wherein the processor, when executing the computer instructions, is configured to implement a method of claim 15.

18. A wireless device comprising a memory for storing computer instructions and a processor in communication with the memory, wherein, when the processor executes the computer instructions, the processor is configured to cause the wireless device to:

determine an initial format for each time block of a transmission resource pool comprising at least one sub-pool including a first sub-pool, wherein the initial format indicate an initial transmission direction configuration for the each time block, wherein:

the initial format of the each time block of the transmission resource pool comprises one of: a downlink (DL) format, an uplink (UL) format, and a flexible format;

an initial format of each time block in each of the at least one sub-pool is same;

an initial format of the first sub-pool is the DL format or the UL format; and an initial transmission direction of the first sub-pool is consistent with the initial format of the first sub-pool; and determine, that a transmission resource segment in the first sub-pool is re-configured from an initial format to an enhanced flexible format, wherein the initial format of the transmission resource segment is same as the initial format of the first sub-pool, and an initial transmission direction of the transmission resource segment is same as an initial transmission direction of the first sub-pool, wherein:

the DL format indicates that an associated transmission resource is dedicated to DL transmission;

the UL format indicates that the associated transmission resource is dedicated to UL transmission;

the flexible format indicates that the associated transmission resource is capable of both DL transmission and UL transmission; and the enhanced flexible format comprises at least one of following enhancements to the flexible format:

the enhanced flexible format provides transmission direction conflict resolution when both DL and UL transmissions are scheduled in a same time block;

the enhanced flexible format inherits a default format from an initial format of the associated transmission resource; and the enhanced flexible format provides a flexible Bandwidth Part (BWP) configuration.

* * * * *